8646X
J. Barron,
Ship Ventilator,
Patented Feb. 20, 1835.
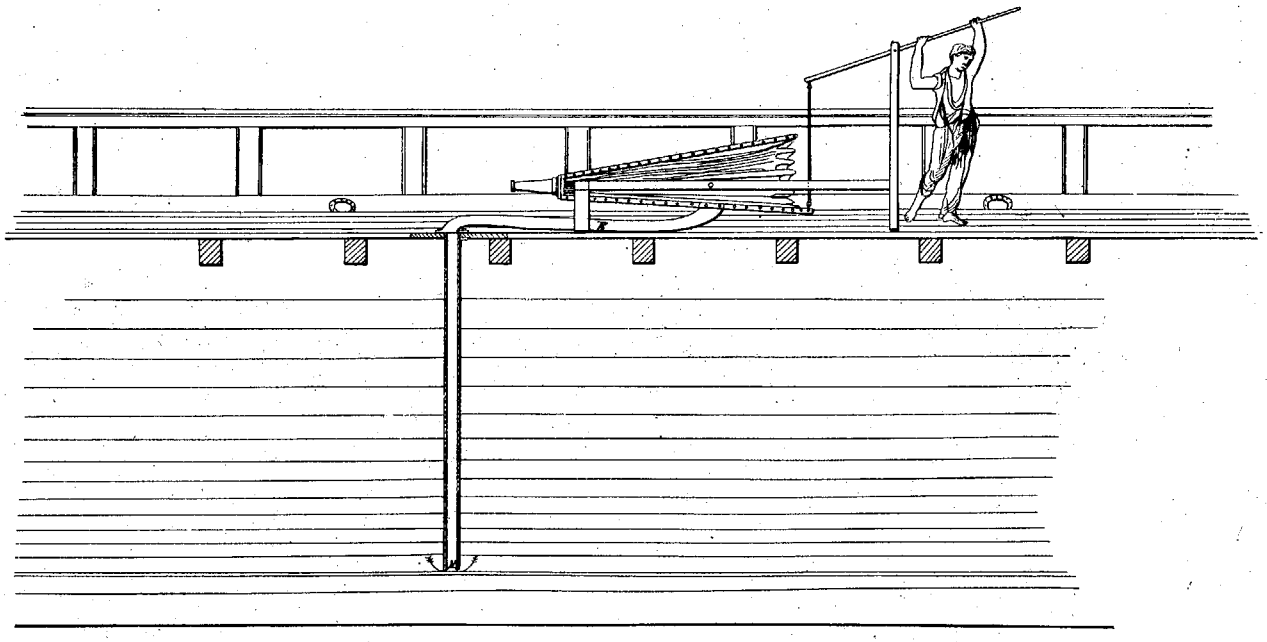
N. PETERS, PHOTO-LITHOGRAPHER, WASHINGTON, D. C.

Patented Feb. 20. 1835

James Barron of Va.
Letters Patent

The schedule referred to in these Letters Patent and making part of the same containing a description in the words of the said James Barron himself of his improvement in the use of the air pump or bellows ventilator for extracting foul air from the interior of ships, houses, or any other confined situations.

---

To all whom these presents shall come; Be it known that I. James Barron of Virginia and of the United States Navy have invented a new and useful improvement in the use of air pumps, not known or used before my application and that the following is a full and exact description thereof.

The air pump that I propose is in the form of a black Smiths bellows, but may be varied in this particular as convenience or arrangement may require; the principle of its operation being retained.

The criterion for working it should be the state of the atmosphere below, to be determined by proper instruments, & by the operation of the prepared exhauster, the air below, or in the interior should be made to correspond constantly with that on the upper deck or in the open atmosphere.

The bellows may be made in any form, perhaps that in common use by black smiths may prove the most convenient, to the bottom of the bellows, and over the admission valve of it, attach an elastic leather hose, and attach the other end of the same hose to the deck, and over the mouth of a copper pipe that must descend down within a few inches of the water that may in common remain in the Ship, by this means the foul air is drawn from the lowest point that the bellows can be allowed to operate on, and if the Ships are so constructing as to admit pipes between their timbers, a cylinder may be placed by the side of the keelson of the ship, and small pipes attached to it, and pass down between the timber boards, which effectually draw the foul air out from the interior of the ships.

The cylinder which is connected to the bellows by the hose, must be attached also to this cylinder from which the small pipes descend 76 8646X into the interior of the Ship, but this latter pipe, or cylinder and the small pipes may all be dispensed with, as it has been found that the perpendicular cylinder alone is quite sufficient. What I claim as my peculiar invention, or discovery is this method as above described for extracting the foul air from Ships, houses, and any other confined situations.

Witnesses
Jno. Laub
N. B. Van Zandt

James Barron

Drawing made

[illegible]

(Drawing)

(481 [illegible])